United States Patent
Yamamoto et al.

(10) Patent No.: US 6,768,091 B2
(45) Date of Patent: Jul. 27, 2004

(54) OPTICAL PICK-UP DEVICE WITH A LIGHT AMOUNT DETECTING DEVICE

(75) Inventors: Takahiro Yamamoto, Nishitokyo (JP); Shigeharu Honda, Tokyo (JP); Kenji Takahashi, Kokubunji (JP)

(73) Assignee: Teac Corporation, Tokyo (JP)

( * ) Notice: Subject to any disclaimer, the term of this patent is extended or adjusted under 35 U.S.C. 154(b) by 19 days.

(21) Appl. No.: 10/342,498

(22) Filed: Jan. 14, 2003

(65) Prior Publication Data
US 2003/0132364 A1 Jul. 17, 2003

(30) Foreign Application Priority Data
Jan. 16, 2002 (JP) ........................................ 2002-007596

(51) Int. Cl.$^7$ ................................................ G02B 27/40
(52) U.S. Cl. ............... 250/201.5; 250/229; 369/53.26; 369/117
(58) Field of Search ......................... 250/201.5, 214 PR, 250/216, 229; 369/53.26, 117–118

(56) References Cited

U.S. PATENT DOCUMENTS 4,868,377 A * 9/1989 Nishikawa ............... 250/201.5
6,463,023 B1 * 10/2002 Miura ...................... 369/53.26
6,584,060 B1 * 6/2003 Oohchida et al. ......... 369/112.05

FOREIGN PATENT DOCUMENTS

JP        07-105567        4/1995

* cited by examiner

Primary Examiner—David Porta
Assistant Examiner—Patrick J. Lee
(74) Attorney, Agent, or Firm—Anderson Kill & Olick P.C.; Eugene Lieberstein; Michael N. Meller

(57) ABSTRACT

An optical pick-up device includes a semi-conductor laser as a laser light-emitting device, a collimator lens, a directional control mirror, an objective lens, a light amount detecting device, a reflecting mirror that reflects leakage light of the laser light onto the light amount detecting device, and a light amount adjusting member that adjusts the amount of light incident on the light amount detecting device, provided between the light amount detecting device and the reflecting mirror. The light amount adjusting member may include a rotatably or slidably-supported baffle of which a rotational angle or slide position is changed so as to adjust the amount of the light.

6 Claims, 12 Drawing Sheets

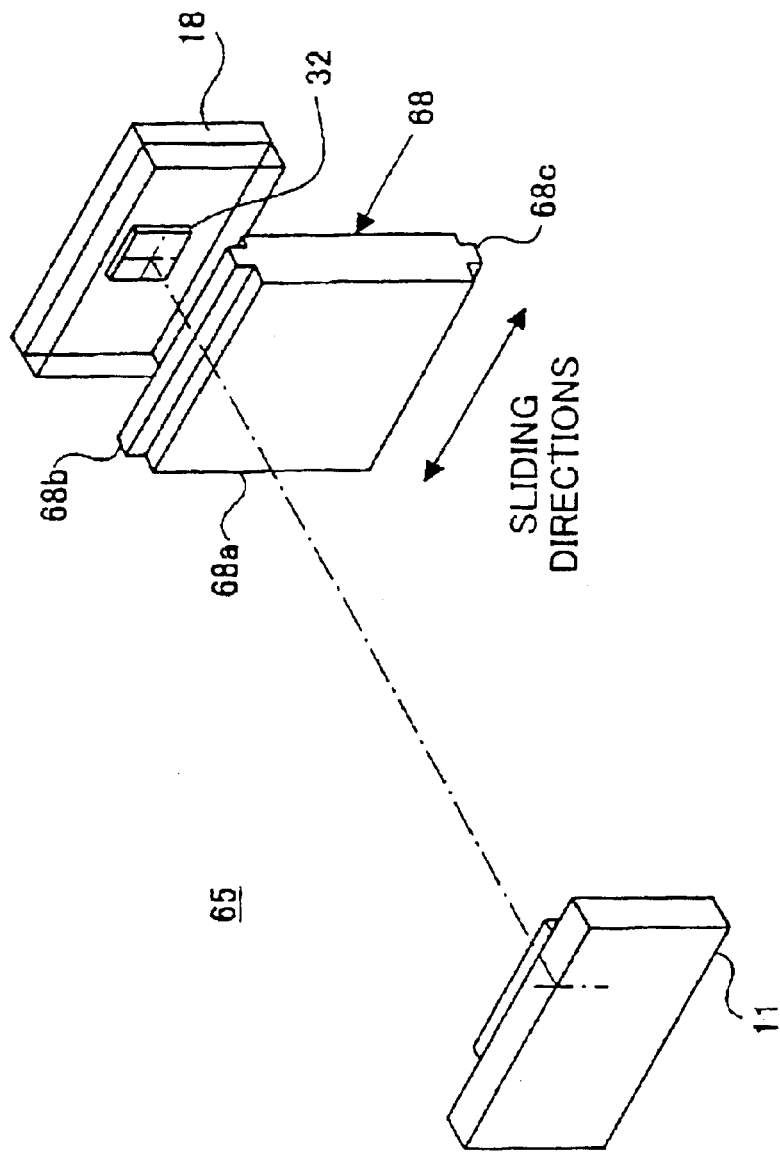

OPTICAL PICK-UP DEVICE WITH A LIGHT AMOUNT DETECTING DEVICE

BACKGROUND OF THE INVENTION

1. Field of the Invention

The present invention generally relates to an optical pick-up device, and in particular, an optical pick-up device having an optical system for irradiating an optical disk with laser light. The optical pick-up device is structured to control a laser light-emitting device for keeping the emission power of the laser light-emitting device constant by detecting the amount of the light outside an effective diameter of an objective lens of the laser light emitted from the laser light-emitting device.

2. Description of the Related Art

Recent years, apparatuses for CD-ROM, CD-R, CD-RW, etc. using an optical disk as a recording medium have been employed as information recording/reproducing apparatuses for a personal computer, etc. These information recording/reproducing apparatuses contain an optical pick-up device structured so that laser light is irradiated onto the optical disk so as to record information and light reflected from the optical disk is detected so as to read the information.

For the kind of information recording/reproducing apparatus, it is necessary to obtain an output level of the laser light for irradiating the optical disk in order to perform stable recording and reproducing process. Accordingly, the optical pick-up device has a laser-light amount detecting unit for detecting an intensity of laser light emitted from a semi-conductor laser which device is structured so as to control or adjust the intensity of the laser light emitted from the semi-conductor laser according to need, based on the intensity of the laser light detected by the laser-light amount detecting unit.

FIG. 1 is a schematic diagram showing one example of a conventional optical pick-up device with light rays from a laser light-emitting device. The optical pick-up device generally includes a semi-conductor laser 1 (a laser diode), a beam splitter 2, a light amount detecting device 3, a collimator lens 4, a directional control mirror 5, and an objective lens 6. In the optical pick-up device, an optical disk 7 is subjected to such a recording/reproducing process that laser light is irradiated onto the optical disk 7 and reflected light is detected and processed.

The laser light (divergent light) emitted due to oscillation of the semi-conductor laser 1 enters the beam splitter 2 and part of the laser light is separated in the beam splitter 2 and enters the light amount detecting device 3.

Output current from the light amount detecting device 3 is approximately proportional to the amount of the laser light passing through the beam splitter 2 and being irradiated onto the optical disk 7, via the collimator lens 4, the directional control mirror 5, and the objective lens 6. Accordingly, the amount of the laser light irradiated onto the optical disk 7 can be adjusted according to need by monitoring the amount of the laser light that enters the light amount detecting device 3 and controlling driving current of the semi-conductor laser 1. Thus, the laser-light amount detecting unit includes the beam splitter 2 and the light amount detecting device 3.

However, since the laser light emitted from the semi-conductor laser 1 is separated in the beam splitter 2 and introduced onto a photo-detection part 9 of the light amount detecting device 3 in the structure of the optical pick-up device (laser-light amount detecting unit) shown in FIG. 1, the problem is that the amount of light for irradiating the optical disk 7 is reduced by the amount of the separated laser light.

Then, in order to solve the problem of the optical pick-up device shown in FIG. 1, an optical pick-up device shown in FIG. 2 has been proposed. The optical pick-up device shown in the FIG. 2 is structured so that the beam-splitter 2 is not used, so as to avoid the loss of the amount of the light.

Specifically, provided is the structure of setting the light amount detecting device 3 at a position inside an area irradiated with the laser light (divergent light) emitted from the semi-conductor laser 1 and outside the effective diameter of the objective lens. The laser light outside the effective diameter of the objective lens (referred to "leakage light", below) does not irradiate the optical disk 7. If the leakage light outside the effective diameter of the objective lens enters the light amount detecting device 3, the amount of light for irradiating the optical disk 7 is not reduced.

In addition to the above structure shown in FIG. 2, also provided is such a structure that a reflecting mirror 8 is arranged between the semi-conductor laser 1 and the collimator lens 4 as shown in FIGS. 3(A) and (B), in which part of the laser light is emitted from the semi-conductor laser 1, reflected to a lateral side at which the light amount detecting device is provided, and received on the photo-detection part 9 of the light amount detecting device 3. In the case of the structure shown in FIGS. 3(A) and (B), since the leakage light outside the effective diameter of the objective lens irradiates the photo-detection part 9 of the light amount detecting device via the reflecting mirror 8, the amount of light for irradiating the optical disk 7 is not reduced.

FIG. 4 shows a light intensity distribution of the laser light at the set position of the light amount detecting device 3 in the optical pick-up device shown in FIG. 2 (or the reflecting mirrors 8 shown in FIGS. 3(A) and (B)). In the optical pick-up device shown in FIG. 2, as shown in FIG. 4, provided is such a structure that light amount detection is performed in the irradiated area with the leakage light outside the effective diameter of the objective lens by utilizing beam broadening in the vertical direction of the semi-conductor laser 1 (or a tangential direction on the disk surface).

However, as shown in FIG. 4, when the light irradiates the total area of the photo-detection part 9 of the light amount detecting device 3, the light intensity may be increased suddenly and the amount of light received at the light amount detecting device 3 may become equal to or more than a necessary light amount.

As a method for solving such problem, for example, provided is such a structure that a light amount limiting member for limiting the light amount is provided in front of the light amount detecting unit and part of light passing through a hole (pin-hole) provided on the light amount limiting member irradiates the photo-detection part of the light amount detecting device, as is disclosed in Japanese Laid-Open Patent Application No. 7-105567. Also, a method for adjusting photo-detection sensitivity of the light amount detecting device 3 using an electric circuit as shown in FIG. 5 has been proposed. The electric circuit is configured such that output (sensitivity) to a front monitor is adjusted by varying a feed back resistor of an operational amplifier AMP. That is, I/V conversion of an output from the light amount detecting device 3 is performed by adjusting the resistor value of a variable resistor VR. Herein, a phase compensation condenser C for adjusting a response waveform from the operational amplifier AMP is also optimized.

However, for the structure with use of the light amount limiting member as disclosed in the aforementioned patent application, since the amount of the leakage light that irradiates the light amount detecting device changes dependent on an output property of the semi-conductor laser, etc., it is necessary to prepare a plurality of light amount limiting members with a hole having a individual diameter and to exchange the light amount limiting members in accordance with the amount of light received on (or photo-detection sensitivity of) the light amount detecting device.

Thus, in the conventional optical pick-up device, the problem is that it has to be confirmed that the amount of light received on the light amount detecting device is an optimum value when the light amount limiting members are exchanged in order to adjust the amount of light to be received on the light amount detecting device to an optimum value and accordingly that exchange operation is a bother.

Also, when the photo-detection sensitivity of the light amount detecting device 3 is adjusted employing the electric circuit as described above (see FIG. 5), the optimization of the phase compensation condenser C has to be performed in accordance with adjustment of the feedback resistor by the variable resistor VR, but the problem is that only a coarse adjustment with a tolerance of the condenser C is allowed, since that adjustment operation is complex and an accurate adjustment is difficult.

SUMMARY OF THE INVENTION

It is a general object of the present invention to provide an optical pick-up device capable of adjusting an amount of light to be received on a light amount detecting device, in which the above disadvantages are eliminated.

The above object of the present invention is achieved by an optical pick-up device including:

- an optical system that irradiates light emitted from a light-emitting device through an objective lens onto a recording medium;
- a light amount detecting device that receives and detects light outside an effective diameter of the objective lens in the light emitted from the light-emitting device; and
- a light amount adjusting member that adjusts an amount of the light to be received on the light amount detecting device, provided between the light-emitting device and the light amount detecting device.

The above object of the present invention is also achieved by an optical pick-up device including:

- an optical system that irradiates light emitted from a light-emitting device through an objective lens onto a recording medium;
- a reflecting mirror that reflects light outside an effective diameter of the objective lens in the light emitted from the light-emitting device;
- a light amount detecting device that receives and detects light reflected from the reflecting mirror, provided in an optical path of the light from the reflecting mirror; and
- a light amount adjusting member that adjusts an amount of the light to be received on the light amount detecting device, provided between the reflecting mirror and the light amount detecting device.

Furthermore, the light amount adjusting member may include a baffle provided rotatably at a position opposing to a receiving surface of the light amount detecting device, wherein the amount of the light to be received on the light amount detecting device is adjusted dependent on a rotational angle of the baffle.

Moreover, the light amount adjusting member may include a baffle provided slidably at a position opposing to a receiving surface of the light amount detecting device, wherein the amount of the light to be received on the light amount detecting device is adjusted dependent on a slide position of the baffle.

According to the invention described above, the amount of light to be received on the light amount detecting device can be adjusted easily, and precision for light amount detection by the light amount detecting device can be improved so as to stabilize the precision for the detection. Also, in the case of employing the electric circuit, since the feedback resistor can be set at a fixed value by providing the light amount adjusting member, optimization of the phase-compensation condenser C can be omitted so as to simplify the adjustment operation. In addition, a conventional laborious operation of exchanging light amount limiting members is not required and the amount of light to be received on the light amount detecting device can be adjusted to an arbitrary value for a short time.

BRIEF DESCRIPTION OF THE DRAWINGS

Other objects, features and advantages of the present invention will become more apparent from the following detailed description when read in conjunction with the accompanying drawings, in which:

FIG. 14 is a perspective view showing the sixth embodiment of a light amount adjusting mechanism.

DETAILED DESCRIPTION OF THE PREFERRED EMBODIMENTS

A description will hereinafter be given of embodiments of the present invention, with reference to the drawings.

Figure 6:
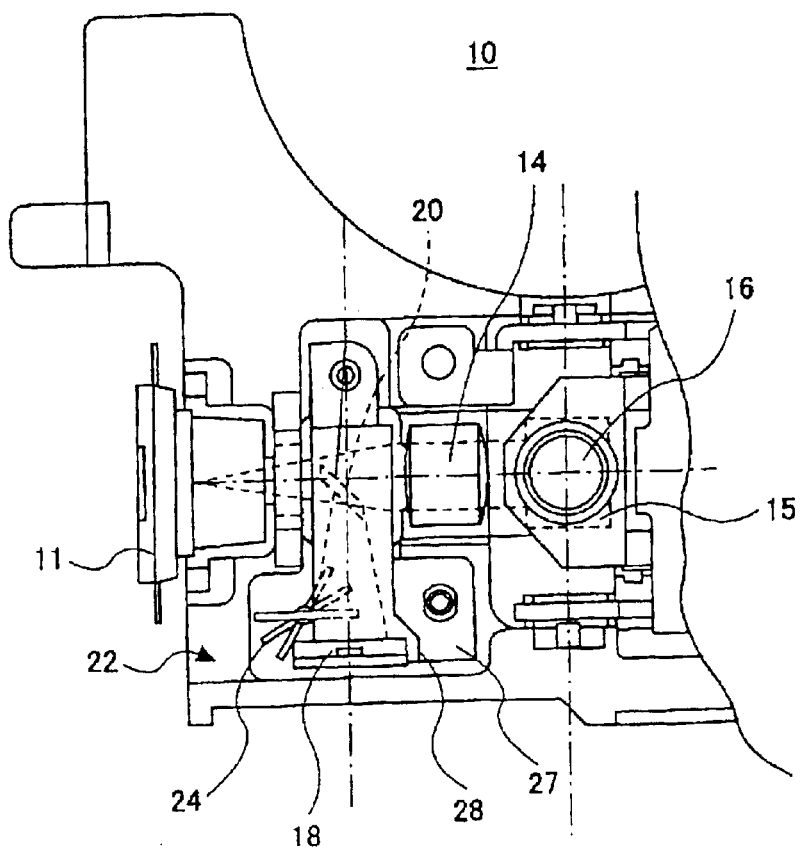
FIG. 6 is a plan view showing the optical pick-up device 10 according to the present invention.
Figure 7:
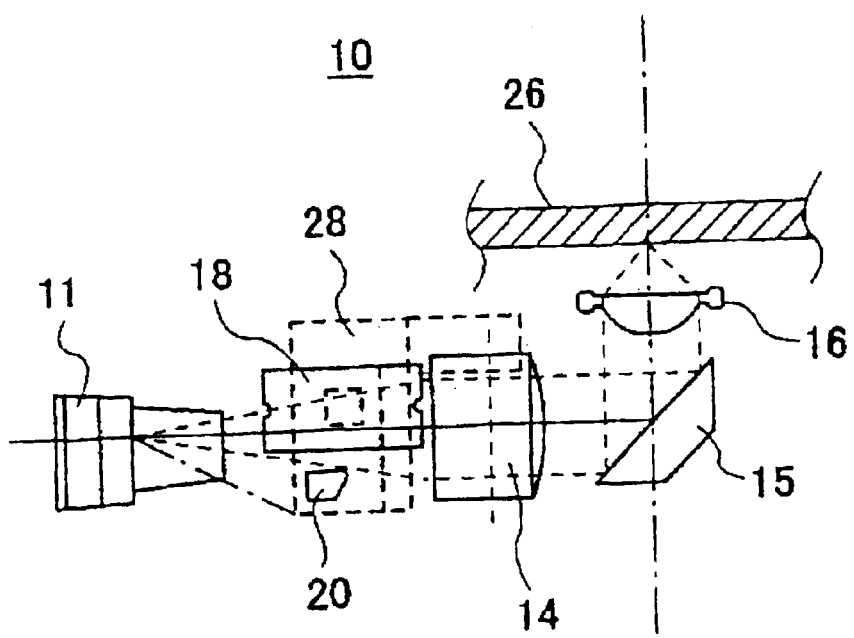
FIG. 7 is a side view of the optical pick-up device 10.

FIG. 6 is a plan view showing an optical pick-up device 10 according to the present invention. FIG. 7 is a side view of the optical pick-up device 10.

As shown in FIG. 6 and FIG. 7, the optical pick-up device 10 generally includes a semi-conductor laser 11 (a laser diode) as a laser light-emitting device, a collimator lens 14, a directional control mirror 15, an objective lens 16, and a light amount detecting device 18 as a laser-light amount detecting unit, a reflecting mirror 20 for reflecting leakage light of laser light emitted from the semi-conductor laser 11 onto the light amount detecting device 18, etc.

Furthermore, in the optical pick-up device 10, a light amount adjusting mechanism (or a light amount adjusting member) 22 for adjusting the amount of light incident on the light amount detecting device 18 is provided between the light amount detecting device 18 and the reflecting mirror 20. The light amount adjusting mechanism 22 adjusts the amount of light incident on the light amount detecting device 18 by controlling a rotational angle of a rotatably-supported light amount adjusting member 24. Thus, the amount of the laser light incident on the light amount detecting device 18 can be adjusted easily, and precision on the amount of the laser light detected on the light amount detecting device 18 can be improved to stabilize the detection precision, by adjusting the rotational angle of the light amount adjusting member 24 to an arbitrary angle.

Figure 1:
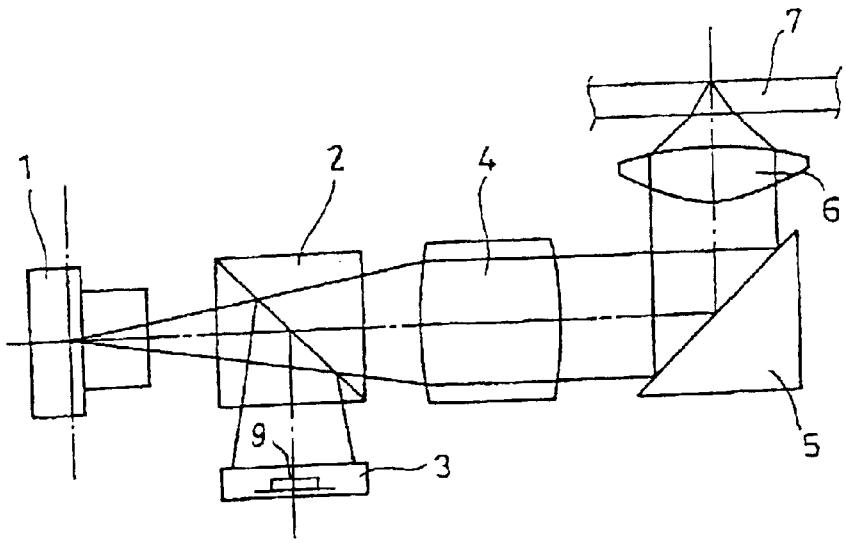
FIG. 1 is a schematic diagram showing one example of a conventional optical pick-up device with light rays from a laser light-emitting device.
Figure 2:
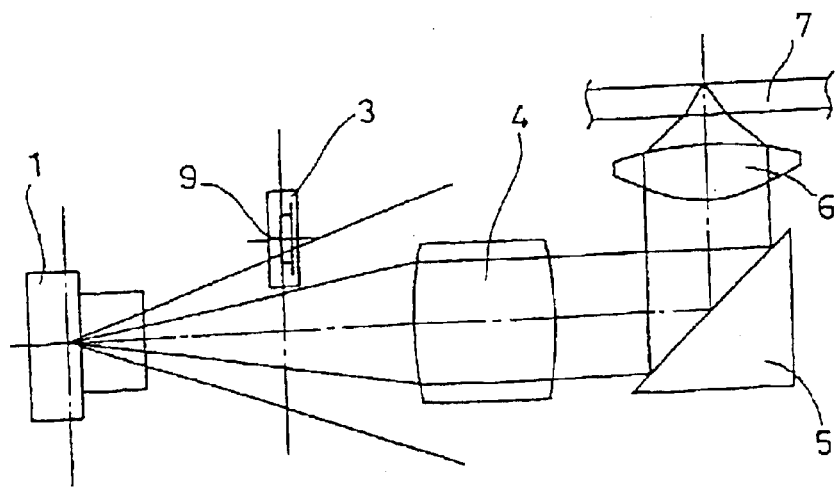
FIG. 2 is a schematic diagram showing another example of a conventional optical pick-up device with light rays from a laser light-emitting device.
Figure 3:
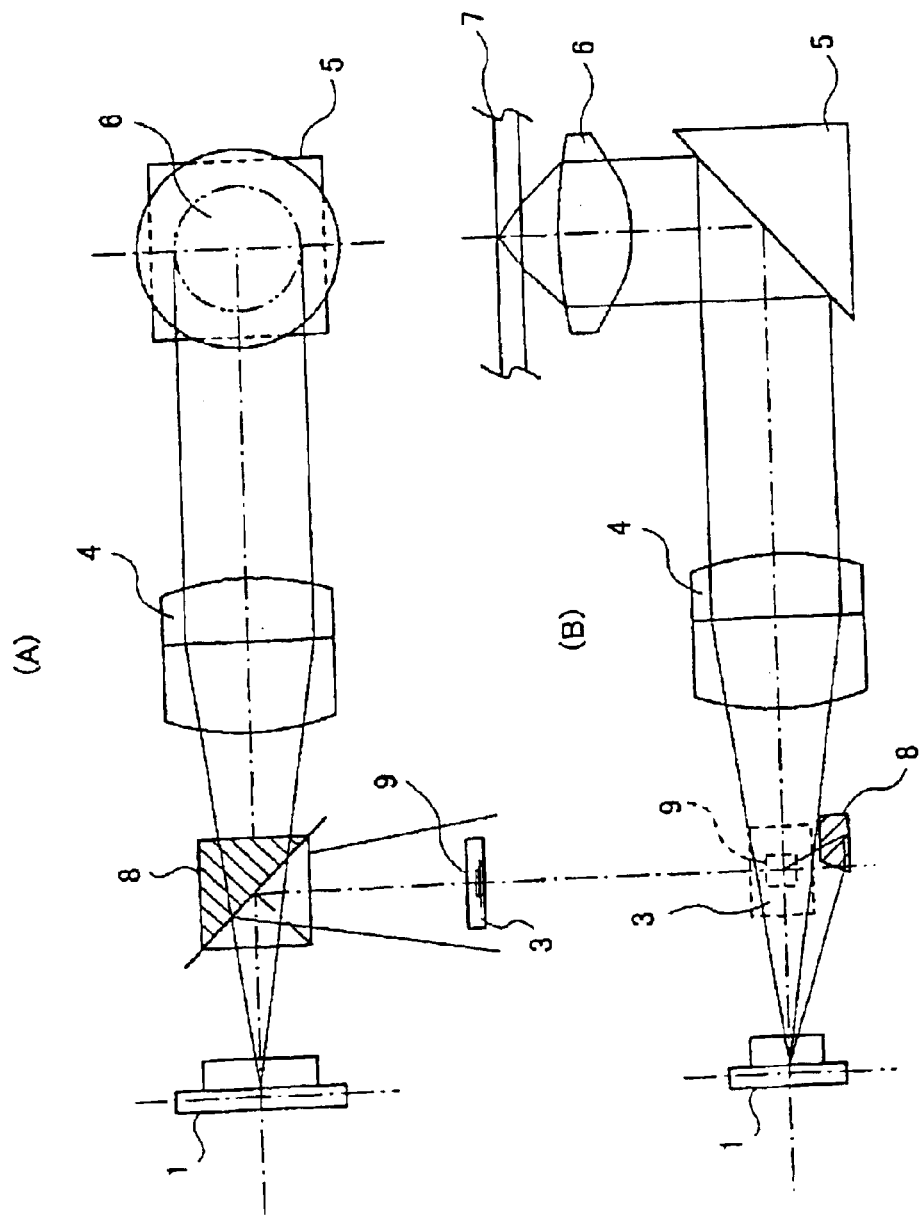
FIG. 3 is a schematic diagram showing yet another example of a conventional optical pick-up device with light rays from a laser light-emitting device, in which (A) is the plan view thereof and (B) is the side view thereof.
Figure 4:
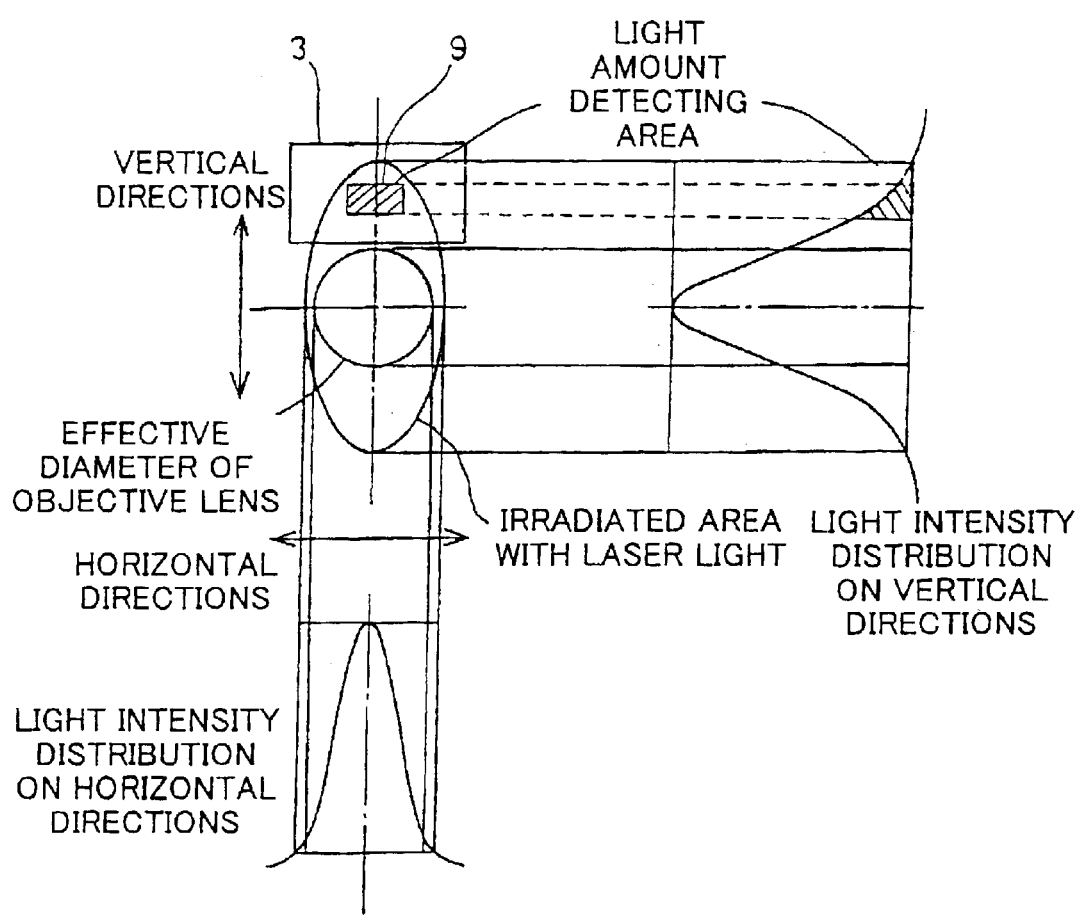
FIG. 4 shows light intensity distribution of laser light at a set position of the light amount detecting device 3 in the optical pick-up device shown in FIG. 2 (or the reflecting mirrors 8 shown in FIGS. 3(A) and (B))
Figure 5:
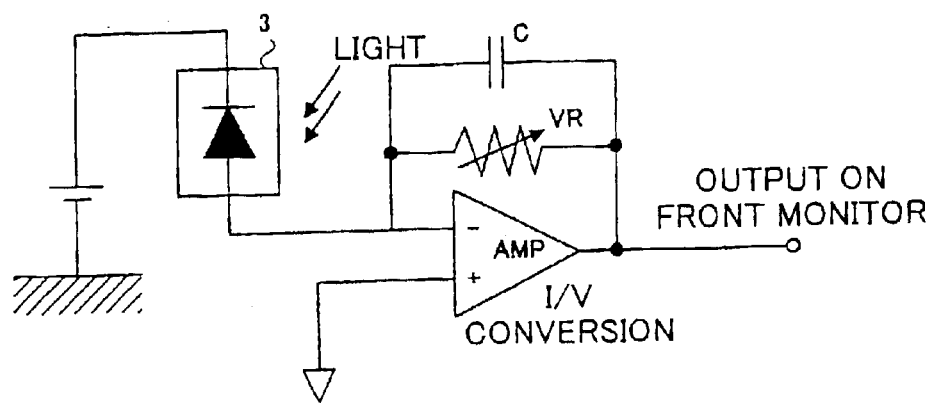
FIG. 5 is a circuit diagram showing one example of an electric circuit for electrically adjusting photo-detection sensitivity of the conventional light amount detecting device 3.

Also, since the aforementioned feed back resistor shown in FIG. 5 can be set at a fixed value as the light amount adjusting member 24 is fixed, optimization of the phase-compensation condenser C in the electric circuit can be omitted so as to simplify the adjustment operation.

Herein, since the optical pick-up device 10 is often made thin for mounting on a note book-type personal computer and it is difficult to arrange the light amount detecting device 18 near the collimator lens 14, the reflecting mirror 20 is provided near the collimator lens 14 and the light amount detecting device 18 is arranged on the lateral side of the reflecting mirror 20.

The optical pick-up device 10 performs a recording/reproduction process to an optical disk 26 by irradiating laser light onto the optical disk 26 and detecting and processing reflected light from the optical disk.

The laser light (divergent light) emitted due to oscillation of the semi-conductor laser 11 is irradiated to the collimator lens 14. The collimator lens 14 is a lens to collimate passing light and thus the divergent laser light emitted from the semi-conductor laser 11 is collimated when light inside an effective diameter of the objective lens 16 passes through the collimator lens 14. Then, leakage light outside the effective diameter of the objective lens diverges out of the collimator lens 14. Also, the laser light collimated by the collimator lens 14 irradiates the directional control mirror 15 as a light spot with a certain beam spot size.

The directional control mirror 15 is configured so that a total reflection film is coated on one surface of a prism and the reflecting surface of the directional control mirror 15 is a surface tilted by 45° against an optical axis of the semi-conductor laser 11. Accordingly, the optical path of the laser light is oriented by 90° by the directional control mirror 15 and the laser light enters the objective lens 16 arranged above the directional control mirror.

A focusing mechanism and a tracking mechanism, etc., not shown in the figure, are attached on the objective lens 16. Accordingly, the objective lens 16 is focus-controlled so that the light spot is focused on a recording surface of the optical disk 26, and tracking-controlled so that the focused light spot coincides with any of tracks formed on the optical disk 26.

Thus, the laser light is irradiated as a beam spot on a certain track position of the optical disk 26. Also, at the time of reproducing, the reflected light from the optical disk 26 is detected on a light detecting device not shown in the figure, and information recorded in the optical disk 26 is reproduced based on the detected light.

Figure 8:
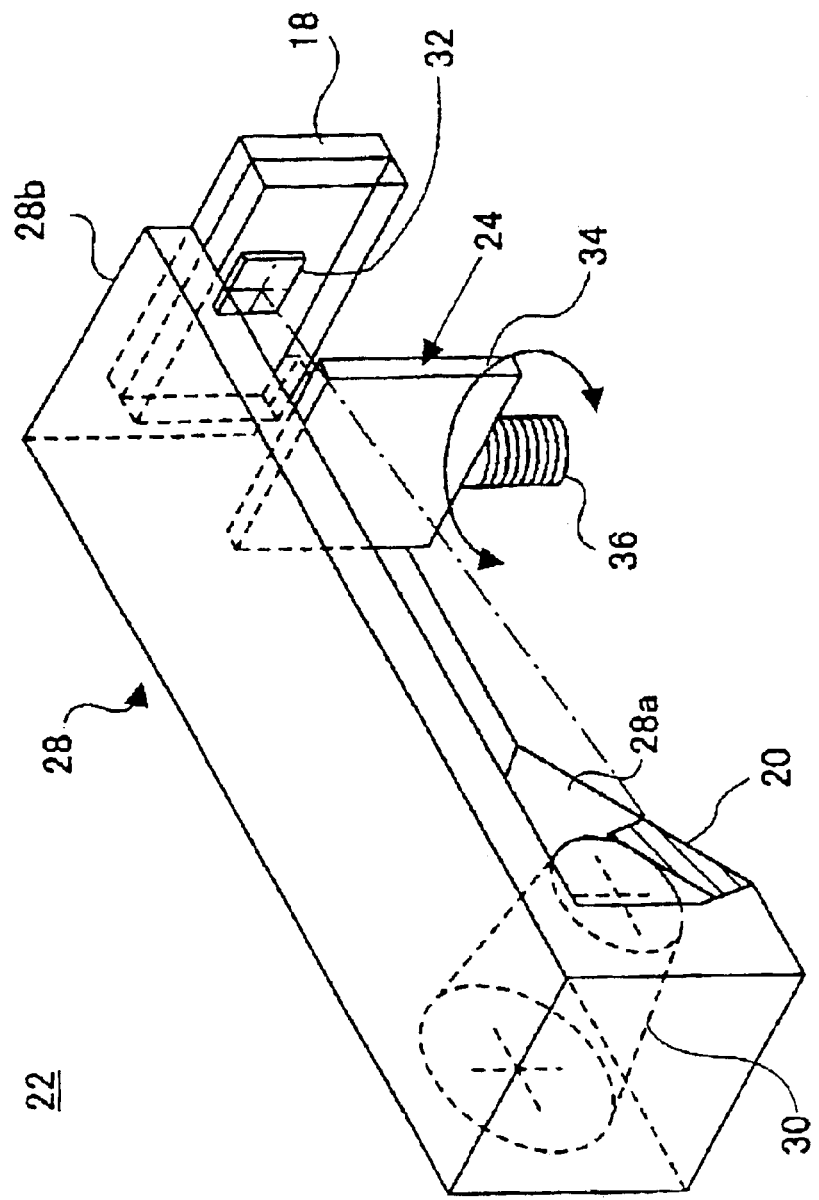
FIG. 8 is a perspective view showing the first embodiment of a light amount adjusting mechanism.

Herein, the light amount adjusting mechanism 22 as the core of the present invention will be illustrated. FIG. 8 is a perspective view showing the first embodiment of the light amount adjusting mechanism 22.

As shown in FIG. 6, FIG. 7, and FIG. 8, the light amount adjusting mechanism 22 includes a base 27 fixed on a chassis (not shown in the figures), a transparent mirror member 28 supported on the base 27, and a reflecting mirror 20 provided on a tilted part 28a of the mirror member 28 other than the aforementioned light amount adjusting member. Also, the light amount detecting device 18 is supported near a side 28b of the mirror member 28.

Also, a perforation hole 30 through the mirror member 28 opposing to the collimator lens 14 is provided. The laser light emitted from the semi-conductor laser 11 passes through the perforation hole 30 and enters the collimator lens 14.

The light amount adjusting member 24 is provided rotatably between the reflecting mirror 20 and the light amount detecting device 18 and located below the mirror member 28. Also, the light amount adjusting member 24 includes a quadrangular-shaped baffle 34 opposing to a photo-detection part 32 of the light amount detecting device 18, and an external thread 36 projecting from the center on the lower side of the baffle 34 downward.

Then, the external thread 36 of the light amount adjusting member 24 is screwed into an internal thread that is not shown in the figures, so that the light amount adjusting member 24 is allowed to rotate around the central axis as a rotational axis. In FIG. 6, the light amount adjusting member 24 is configured such that the distance from the rotational axis of the external thread 36 to one side of the quadrangular-shaped baffle 34 which side is parallel to the rotational axis, is near equal to, the distance from one side of the quadrangular-shaped light amount detecting device 18 which side is nearest to the rotational axis to one side of the photo-detection part 32 which side is farthest from the rotational axis. In such configuration, the baffle 34 could shield the photo-detection part 32 entirely, as the baffle 34 is parallel to the light amount detecting device 18.

Now, when the baffle 34 is parallel to the light amount detecting device 18, the rotational angle of the light amount adjusting member 24 or the baffle 34 against the light amount detecting device 18 is referred to as zero. In such configuration, as the rotational angle is zero, the amount of light incident on the photo-detection part 32 is zero. Then, as the rotational angle of the light amount adjusting member 24 against the light amount detecting device 18 is changed, shielding rate (%) for the photo-detection part 32 is adjusted. That is, the amount of light incident on the photo-detection part 32 can be controlled to be a certain value.

Figure 9:
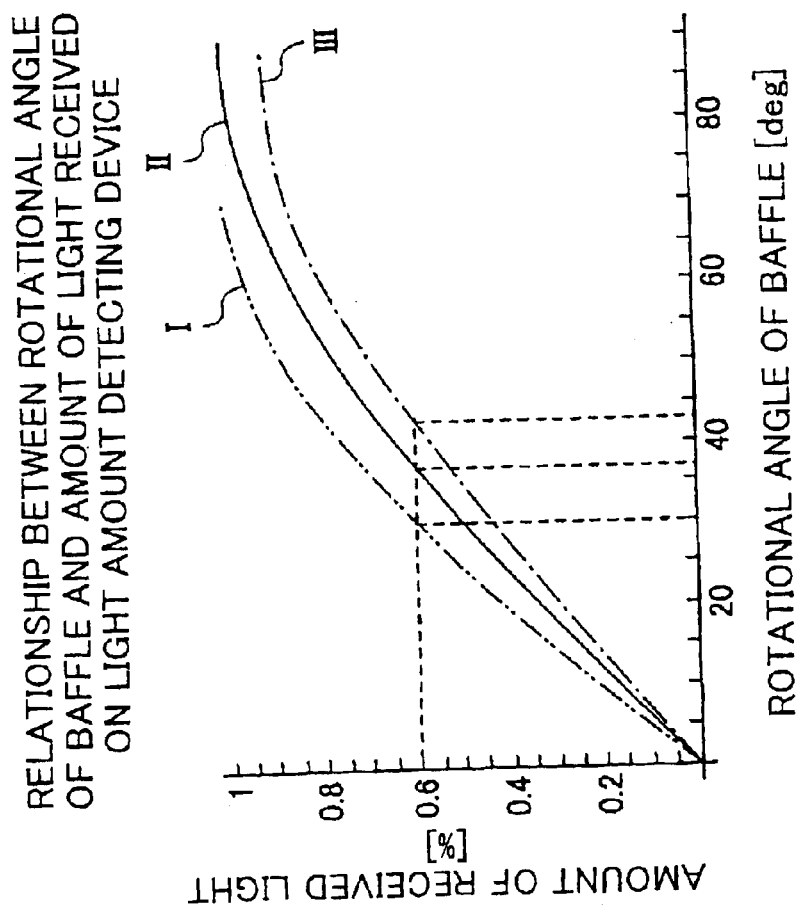
FIG. 9 is a graph showing a relationship between a rotational angle of a baffle and the amount of light received on a light amount detecting device.

Furthermore, the amount of light received on the photo-detection part 32 can be adjusted dependent on the rotational angle of the light amount adjusting member 24 as shown in FIG. 9. The amounts of the laser light emitted from the semi-conductor lasers 11 are not constant and have a certain deviation for products of the optical pick-up device 10. Regarding an amount of the leakage light reflecting from the reflecting mirror 20 to the light amount detecting device 18, if the total amount of the laser light is referred to as 100%, approximately 1% of the amount of the laser light enters the photo-detection part 32.

Then, when the rotational angle of the baffle 34 or the light amount adjusting member 24 is 90° against the light amount detecting device 18, the amount of light reflected from the reflecting mirror 20 enters the photo-detection part 32 without shielding. On the other hand, when the rotational angle of the baffle 34 is 0° or the baffle 34 is parallel to the light amount detecting device 18, the amount of light incident on the photo-detection part 32 is a minimum value (in this case, equals approximately zero).

For example, in the FIG. 9, in the case of the semi-conductor laser 11 with a characteristic as shown in Graph I, the amount of the light received on the photo-detection part 32 can be set at 0.6% of the total of the laser light by adjusting the rotational angle of the light amount adjusting member 24 at 30°.

Furthermore, in the case of the semi-conductor laser 11 with a characteristic as shown in Graph II, the amount of the light received on the photo-detection part 32 can be set at 0.6% of the total of the laser light by adjusting the rotational angle of the light amount adjusting member 24 at 36°.

Moreover, in the case of the semi-conductor laser 11 with a characteristic as shown in Graph III, the amount of the light received on the photo-detection part 32 can be set at 0.6% of the total of the laser light by adjusting the rotational angle of the light amount adjusting member 24 to 42°.

Thus, the amount of light incident on the photo-detection part 32 of the light amount detecting device 18 can be adjusted to a desired quantity by adjusting the rotational angle of the light amount adjusting member 24 to an arbitrary angle. Hence, for the optical pick-up device 10 in the embodiment, such a laborious operation of exchanging light amount limiting members with different sizes of the pin-holes is not required. Consequently, according to the embodiment, the amount of light received on the light amount detecting device 18 can be adjusted to an arbitrary value for a short time.

Finally, after the rotational angle of the light amount adjusting member 24 is adjusted to an arbitrary angle, an adhesive is applied on the external thread 36 in order to fix the rotational angle of the light amount adjusting member 24.

Figure 10:
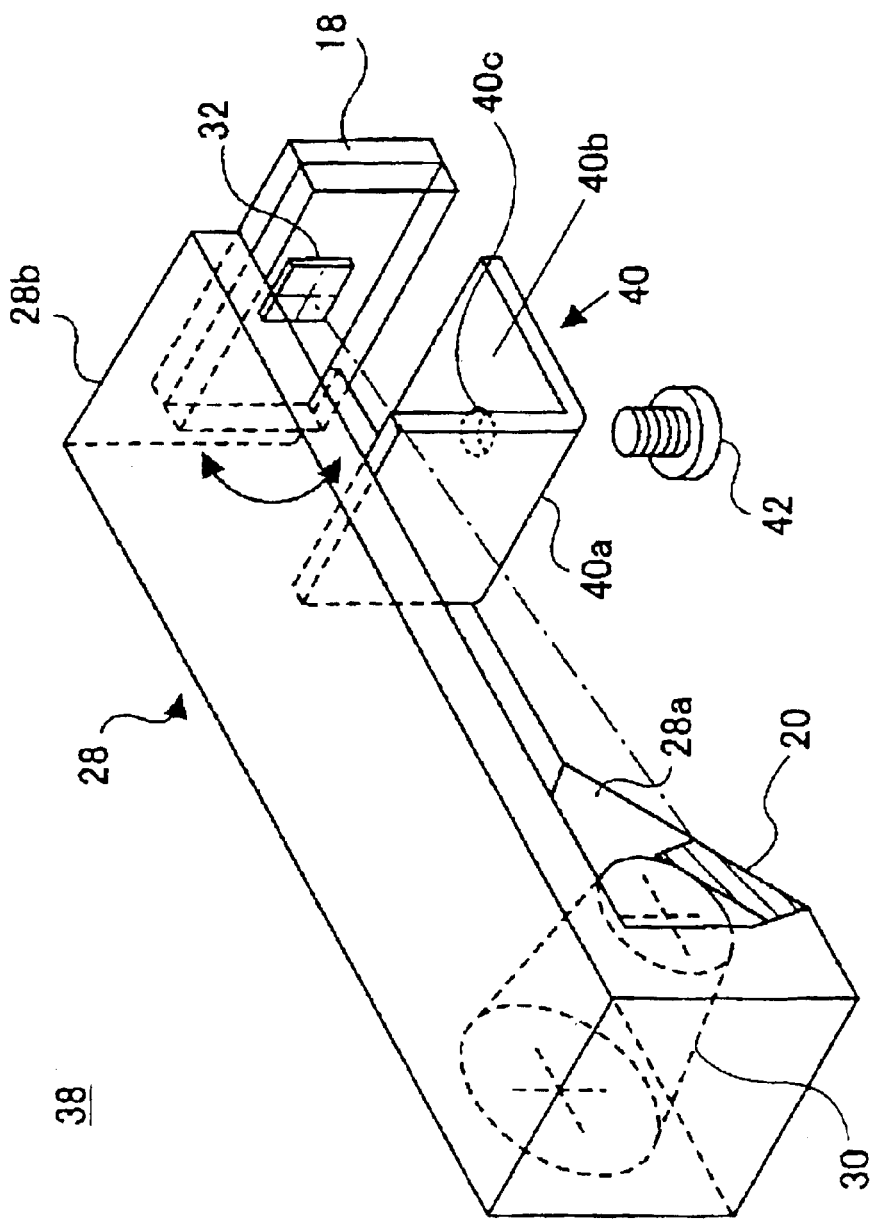
FIG. 10 is a perspective view showing the second embodiment of a light amount adjusting mechanism.

FIG. 10 is a perspective view showing the second embodiment of a light amount adjusting mechanism. In FIG. 10, the same numerals are appended to the same elements as those of the aforementioned embodiment and the explanation for the elements will be omitted.

As shown in FIG. 10, a light amount adjusting mechanism 38 in the second embodiment includes a L-shaped light amount adjusting member 40 and a machine screw 42 screwing into the light amount adjusting member 40 from the side of lower surface of the base 27. The light amount adjusting member 40 includes a vertical plate 40a opposing to the photo-detection part 32 of the light amount detecting device 18, a horizontal plate 40b mounted on the base 27, and a tapped hole 40c provided on the horizontal plate 40b.

Then, the machine screw 42 is inserted through a perforation hole (not shown in the figure) of the base 27 and screwed into the tapped hole 40c of the light amount adjusting member 40 so that the light amount adjusting member 40 is fastened to the base 27. However, the light amount adjusting member 40 can be rotated around the central axis of the machine screw 42 as a rotational axis. Accordingly, the amount of light incident on the photo-detection part 32 of the light amount detecting device 18 is adjusted to a desired certain quantity by adjusting the rotational angle against the photo-detection part 32 of the light amount detecting device 18.

Finally, after the rotational angle of the light amount adjusting member 24 is adjusted to an arbitrary angle, an adhesive is applied on the machine screw 42 to fix the rotational angle of the light amount adjusting member 24.

Figure 11:
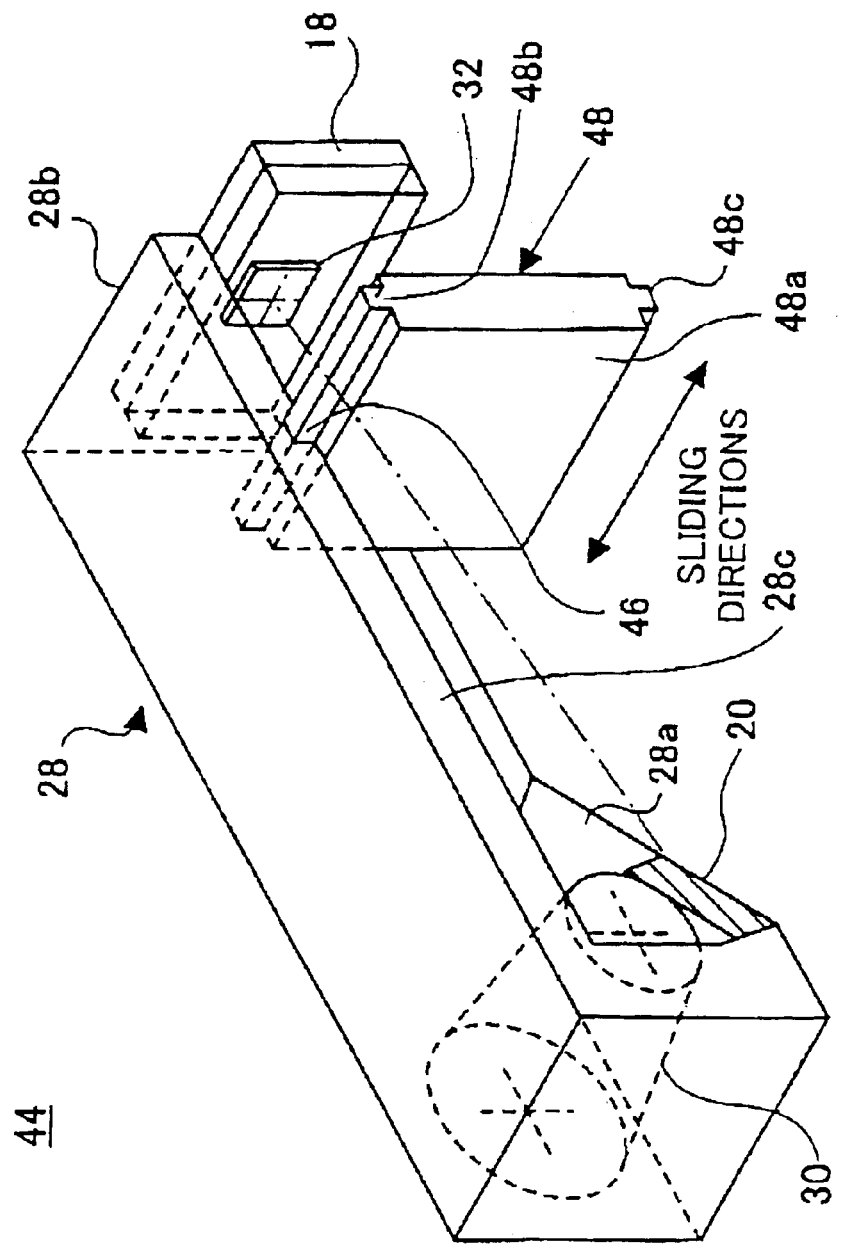
FIG. 11 is a perspective view showing the third embodiment of a light amount adjusting mechanism.

FIG. 11 is a perspective view showing the third embodiment of a light amount adjusting mechanism. In FIG. 11, the same numerals are appended to the same elements as those of the aforementioned embodiment and the explanation for the elements will be omitted.

As shown in FIG. 11, a light amount adjusting mechanism 44 includes grooves 46 provided on a beam portion 28c of a mirror member 28 and the base 27, and a light amount adjusting member 48 fitting to the grooves 46 and being slidably installed. The light amount adjusting member 48 includes a baffle 48 opposing to the photo-detection part 32 of the light amount detecting device 18, an upper guide part 48b fitting slidably to the groove 46 provided on the beam portion 28c of the mirror member 28, and a lower guide part 48c fitting slidably to a groove (not shown in the figure) provided on the base 27.

Then, the position of the light amount adjusting member 48 against the photo-detection part 32 of the light amount detecting device 18 is adjusted by sliding the upper guide part 48b and the lower guide part 48c, so that an amount of light incident on the photo-detection part 32 of the light amount detecting device 18 is adjusted to a desired quantity.

Then, after the position of the light amount adjusting member 48 is adjusted to an arbitrary position, an adhesive is applied to the upper guide part 48b and the lower guide part 48c so as to fix the position of the light amount adjusting member 48.

Figure 12:
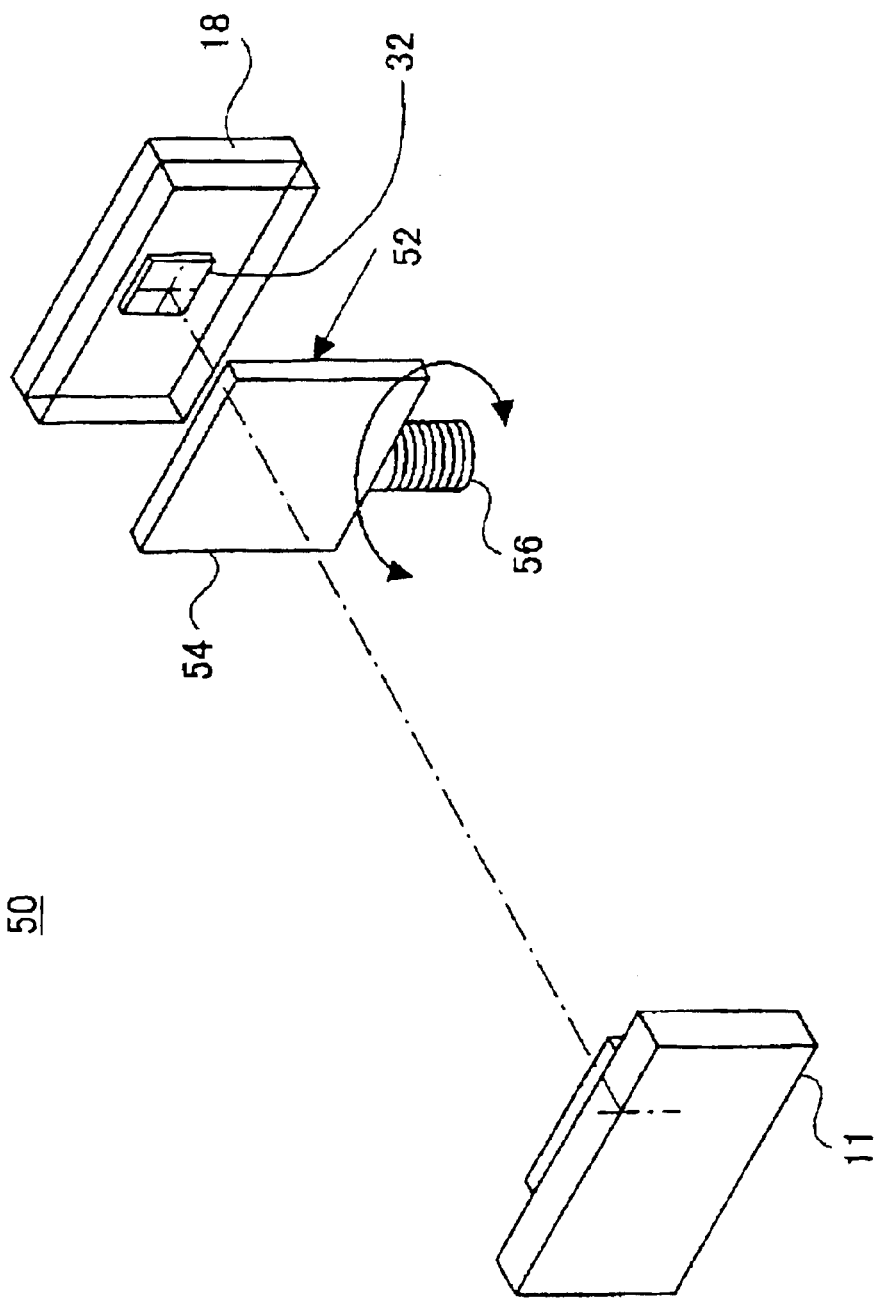
FIG. 12 is a perspective view showing the fourth embodiment of a light amount adjusting mechanism.

FIG. 12 is a perspective view showing the fourth embodiment of a light amount adjusting mechanism. In FIG. 12, the same numerals are appended to the same elements as those of the aforementioned embodiment and the explanation for the elements will be omitted.

As shown in FIG. 12, a light amount adjusting mechanism 50 in the fourth embodiment has such a structure that the mirror member 28 and the reflecting mirror 20 shown in the aforementioned first to third embodiments are not required and a light amount detecting device 18 is arranged at the side of a collimator lens 14. Also, a light amount adjusting mechanism 50 includes a light amount adjusting member 52 provided between the semi-conductor laser 11 and the light amount detecting device 18.

The light amount adjusting member 52 includes a quadrangular-shaped baffle 54 opposing to the photo-detection part 32 of the light amount detecting device 18, and an external thread 56 projecting from the center on the lower side of the baffle 54 downward.

Then, the external thread 56 of the light amount adjusting member 52 is screwed into an internal thread that is not shown in the figures, so that the light amount adjusting member 52 is allowed to rotate around the central axis as a rotational axis. In FIG. 12, the light amount adjusting member 52 is configured such that the distance from the rotational axis of the external thread 56 to one side of the quadrangular-shaped baffle 54 which side is parallel to the rotational axis, is near equal to, the distance from one side of the quadrangular-shaped light amount detecting device 18 which side is nearest to the rotational axis to one side of the photo-detection part 32 which side is farthest from the rotational axis. In such configuration, the baffle 54 could shield the photo-detection part 32 entirely, as the baffle 54 is parallel to the light amount detecting device 18.

Now, when the baffle 54 is parallel to the light amount detecting device 18, the rotational angle of the light amount adjusting member 52 or the baffle 54 against the light amount detecting device 18 is referred to as zero. In such configuration, as the rotational angle is zero, the amount of light incident on the photo-detection part 32 is zero. Then, as the rotational angle of the light amount adjusting member 52 against the light amount detecting device 18 is changed, shielding rate (%) for the photo-detection part 32 is adjusted. That is, the amount of light incident on the photo-detection part 32 can be controlled to be a certain value.

Thus, the amount of light incident on the photo-detection part 32 of the light amount detecting device 18 can be adjusted to a desired quantity by adjusting the rotational angle of the light amount adjusting member 52 to an arbitrary angle.

Then, after the rotational angle of the light amount adjusting member 52 is adjusted to an arbitrary angle, an adhesive is applied on the external thread 56 in order to fix the rotational angle of the light amount adjusting member 52.

Figure 13:
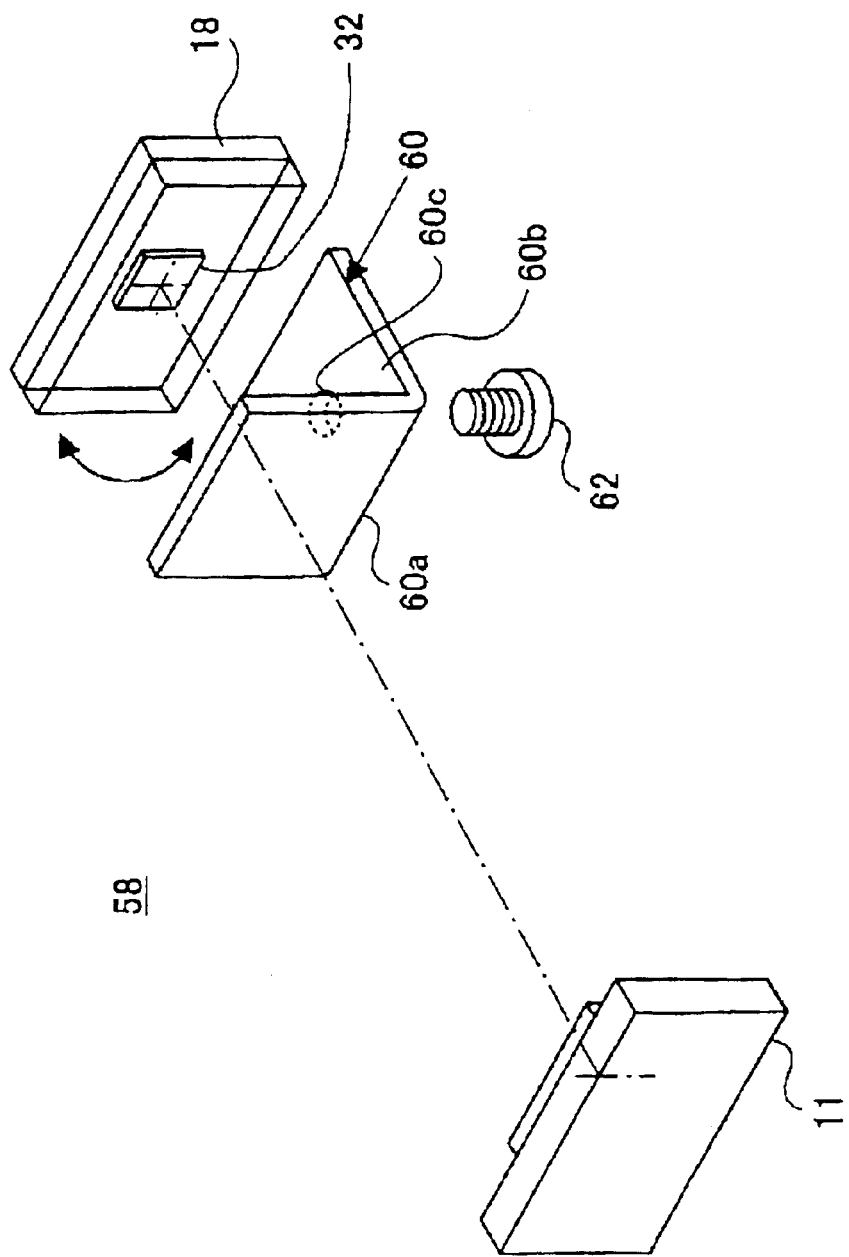
FIG. 13 is a perspective view showing the fifth embodiment of a light amount adjusting mechanism.

FIG. 13 is a perspective view showing the fifth embodiment of a light amount adjusting mechanism. In FIG. 13, the same numerals are appended to the same elements as those of the aforementioned embodiment and the explanation for the elements will be omitted.

As shown in FIG. 13, a light amount adjusting mechanism 58 in the fifth embodiment has such a structure that the mirror member 28 and the reflecting mirror 20 are not required, similar to the aforementioned fourth embodiment, and a light amount detecting device 18 is arranged at the lateral side of a collimator lens 14. Also, the light amount adjusting mechanism 58 includes an L-shaped light amount adjusting member 60 provided between the semi-conductor laser 11 and the light amount detecting device 18, and a machine screw 62 screwing through the light amount adjusting member 60 and the base 27.

The light amount adjusting member 60 includes a vertical plate 60a opposing to the photo-detection part 32 of the light amount detecting device 18, a horizontal plate 60b mounted on the base 27, and a tapped hole 60c provided on the horizontal plate 60b.

Then, as the machine screw 62 is inserted into an attachment hole (not shown in the figure) of base 27 and screws into the tapped hole 60c, the light amount adjusting member 60 is fastened to the base 27. However, the light amount adjusting member 60 can be rotated around the central axis of the machine screw 62 as a rotational axis, and an amount of light incident on the photo-detection part 32 of the light amount detecting device 18 is adjusted to a desired quantity by adjusting the rotational angle against the photo-detection part 32 of the light amount detecting device 18.

Finally, after the rotational angle of the light amount adjusting member 60 is adjusted to an arbitrary angle, an adhesive is applied on the machine screw 62 in order to fix the rotational angle of the light amount adjusting member 60.

FIG. 14 is a perspective view showing the sixth embodiment of a light amount adjusting mechanism. In FIG. 14, the same numerals are appended to the same elements as those of the aforementioned embodiment and the explanation for the elements will be omitted.

As shown in FIG. 14, a light amount adjusting mechanism 65 in the sixth embodiment has such a structure that the mirror member 28 and the reflecting mirror 20 are not required, similar to the aforementioned fourth and fifth embodiments, and a light amount detecting device 18 is arranged at the side of a collimator lens 14. Also, the light amount adjusting mechanism 65 includes guide grooves provided on chassis (not shown in the figure) or a base (not shown in the figure) and a light amount adjusting member 68 fitting slidably to the grooves 46.

The light amount adjusting member 68 includes a baffle 68a opposing to the photo-detection part 32 of the light amount detecting device 18, an upper guide part 68b fitting slidably to the guide groove not shown in the figure, and a lower guide part 68c fitting slidably to the guide groove (also not shown in the figure) provided on the chassis or the base.

Then, the position of the light amount adjusting member 68 against the photo-detection part 32 of the light amount detecting device 18 is adjusted by sliding the upper guide part 68b and the lower guide part 68c, so that an amount of light incident on the photo-detection part 32 of the light amount detecting device 18 is adjusted to a desired quantity.

Herein, after the position of the light amount adjusting member 68 is adjusted to an arbitrary position, an adhesive is applied to the upper guide part 68b and the lower guide part 68c in order to fix the position of the light amount adjusting member 68.

In the embodiments described above, the case of performing such an adjustment that the amount of light to be received on the photo-detection part 32 of the light amount detecting device 18 is controlled to be equal to or less than 1% of the laser light emitted from the semi-conductor laser 11 has been illustrated. However, it goes without saying that the amount of the light received on the photo-detection part 32 is not limited to the above case and can be set to an arbitrary value.

Further, the present invention is not limited to these embodiments, but various variations and modifications may be made without departing from the scope of the present invention.

The present application is based on Japanese priority application No. 2002-7596 filed on Jan. 16, 2002, the entire contents of which are hereby incorporated by reference.

What is claimed is:

1. An optical pick-up device comprising:
   an optical system that irradiates light emitted from a light-emitting device through an objective lens onto a recording medium;
   a light amount detecting device that receives and detects light outside an effective diameter of the objective lens in the light emitted from the light-emitting device; and
   a light amount adjusting member that adjusts an amount of the light to be received on the light amount detecting device, provided between the light-emitting device and the light amount detecting device.

2. The optical pick-up device as claimed in claim 1, wherein the light amount adjusting member comprises a baffle provided rotatably at a position opposing to a receiving surface of the light amount detecting device, and the amount of the light to be received on the light amount detecting device is adjusted dependent on a rotational angle of the baffle.

3. The optical pick-up device as claimed in claim 1, wherein the light amount adjusting member comprises a baffle provided slidably at a position opposing to a receiving surface of the light amount detecting device, and the amount of the light to be received on the light amount detecting device is adjusted dependent on a slide position of the baffle.

4. An optical pick-up device comprising:

an optical system that irradiates light emitted from a light-emitting device through an objective lens onto a recording medium;

a reflecting mirror that reflects light outside an effective diameter of the objective lens in the light emitted from the light-emitting device;

a light amount detecting device that receives and detects light reflected from the reflecting mirror, provided in an optical path of the light from the reflecting mirror; and a light amount adjusting member that adjusts an amount of the light to be received on the light amount detecting device, provided between the reflecting mirror and the light amount detecting device.

5. The optical pick-up device as claimed in claim 4, wherein the light amount adjusting member comprises a baffle provided rotatably at a position opposing to a receiving surface of the light amount detecting device, and the amount of the light to be received on the light amount detecting device is adjusted dependent on a rotational angle of the baffle.

6. The optical pick-up device as claimed in claim 4, wherein the light amount adjusting member comprises a baffle provided slidably at a position opposing to a receiving surface of the light amount detecting device, and the amount of the light to be received on the light amount detecting device is adjusted dependent on a slide position of the baffle.

* * * * *